Oct. 11, 1955 R. O. DEAN 2,720,601
DYNAMO ELECTRIC MACHINE
Filed Jan. 19, 1953 3 Sheets-Sheet 1

INVENTOR.
ROBERT DEAN
BY James F. Franklin
ATTORNEY

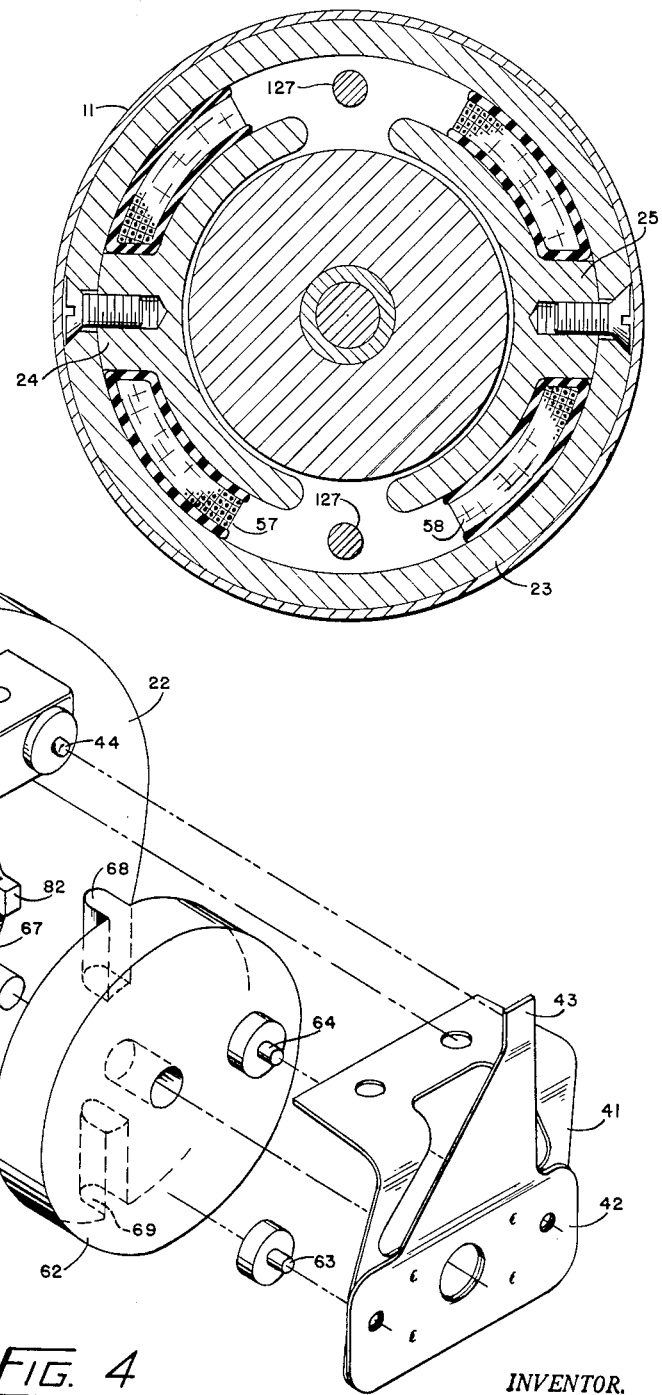

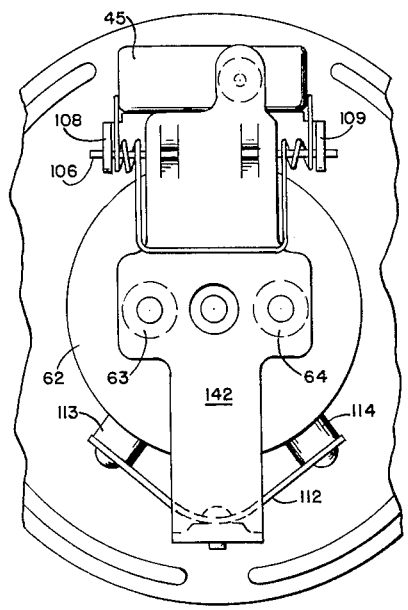
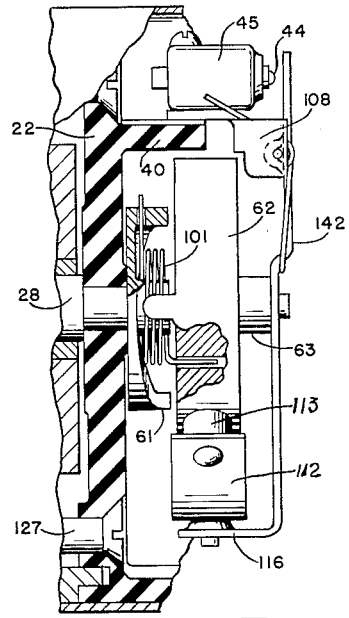
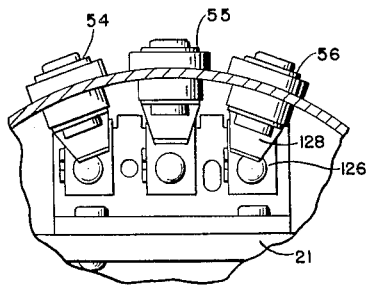
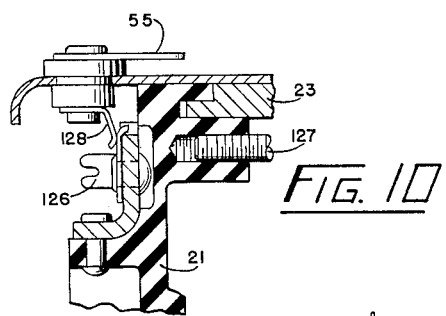
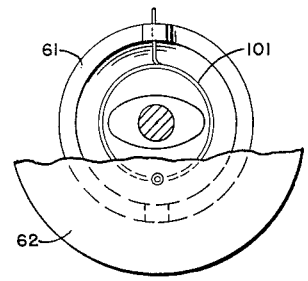
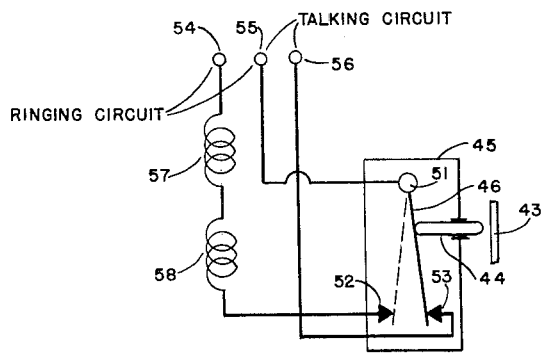
INVENTOR.
ROBERT DEAN

2,720,601

United States Patent Office

Patented Oct. 11, 1955

2,720,601

DYNAMOELECTRIC MACHINE

Robert O. Dean, Owosso, Mich., assignor to Redmond Company, Inc., Owosso, Mich., a corporation of Michigan Application January 19, 1953, Serial No. 331,908

20 Claims. (Cl. 310—69)

This invention relates to dynamoelectric machines and particularly to current generating machines adapted for relatively low speed or manual operation, as by the turning of a hand-operable crank attached to or connecting with the rotor shaft of the machine.

For the generation of electric current to send signaling impulses, as in certain types of telephone systems, it is customary to employ a current generator of relatively small dimensions, involving usually a rotor having an inductor element or elements of permanently magnetic material and a wound stator having two salient poles producing, upon rotation of the inductor type rotor, an alternating magnetic flux and resulting current suitable for the transmission of signaling impulses through telephone circuits connecting with the terminals of the stator windings; the rotor of the machine being operated manually through the instrumentality of a crank at one end of the machine. In order to provide for the automatic transfer of circuit connections, as between the "talking circuit" and the signaling ("ringing") circuit, it is customary to include, as an integral part of the machine, some type of automatic switching mechanism to render the ringing circuit operative only when the machine is being "cranked."

One object of the present invention is to provide in a manually operable current generating machine of the character indicated, a novel automatic mechanism for operating electrical contacts in a signal controlling circuit in response to manual rotation of the rotor of the machine.

A second object of the invention is to provide, in an automatic circuit controlling mechanism of the character indicated, novel means for preventing "fluttering" of the contact elements of the circuit controlling mechanism whether prior to, during, or following movement of the switch contacts to the circuit-closing position.

A third object of the invention is to provide a novel circuit controlling mechanism incorporating friction exerting elements responsive to the rotational force to control operation of the contact elements in such manner as to suppress vibrating tendencies and thus eliminate flutter.

These and other objects of the invention will be better understood on reference to the following description of the embodiment of the invention illustrated in the accompanying drawings wherein:

Fig. 4 is an "exploded" perspective view switch actuating mechanism, the view being taken with the movable parts in their outer positions;

Fig. 5 is a sectional view along line 5—5 of Fig. 3;

Figs. 6, 7 and 8 show a second embodiment of the switch actuating mechanism;

Figs. 9 and 10 show a second embodiment of the terminal structure; and

Fig. 11 is a diagram of the electrical action.

Figures 1, 2:
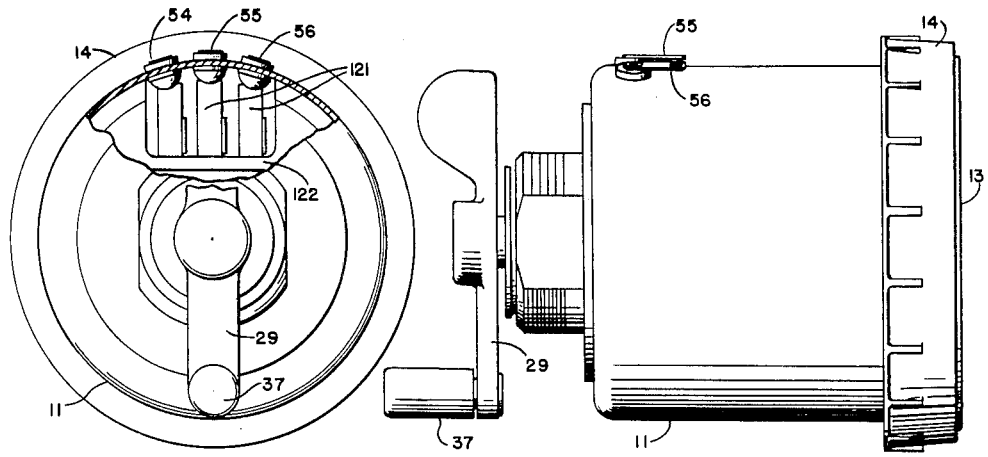
Figs. 1, 2 and 3 are, respectively, side, end and central sectional views of a machine embodying the invention.
Figure 3:
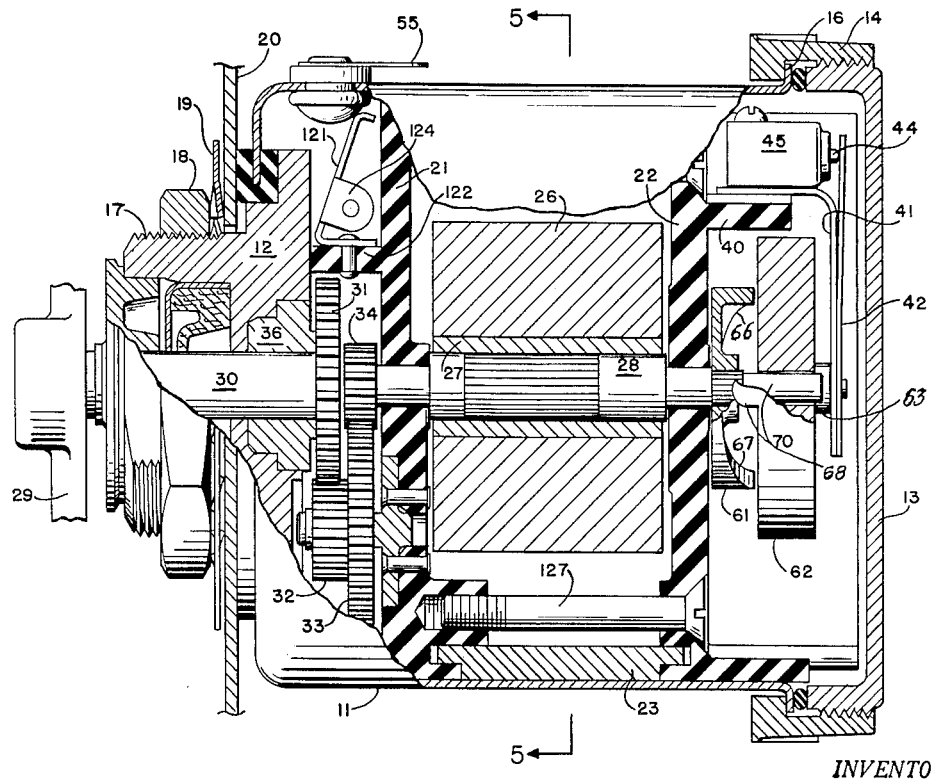

Referring first to Figs. 1, 2 and 3 the machine is shown as including a sectional housing composed of a cup-shaped metallic stamping 11, a mounting hub 12, a cover plate 13, and a locking ring 14 threaded on the plate 13 and having registry with the circular flange 16 in which stamping 11 terminates and by means of which the stamping and cover plate 13 are held in assembly. Hub 12 has a threaded shank 17 receiving a nut 18 and lockwasher 19 by which the machine may be attached to an external supporting element 20. Secured between the non-conducting elements 21 and 22 is a field ring 23 (see also Fig. 5) to which field ring the salient pole assemblies 24, 25 (Fig. 5) are attached. The rotor of the machine is indicated 26 as being mounted upon a spool or sleeve 27 secured to a central shaft 28 adapted to be rotated by the manually operable crank handle 29 acting through the interposed gear train. As shown the gear train includes spur gears 31, 32, and 33, the gear 31 being integrated with a shaft 30 whose axis is aligned with that of the shaft 28, and gear 33 being in mesh with a pinion 34 secured at the end of shaft 28. Bearing plates 21, 22 support the rotor; there being additional bearing means 36 interposed between the shaft 30 and the surface of the casting 12. The crank handle 37 is pivotally mounted on the main body 29 of the crank and the body of the crank is in turn secured to the shaft 30 by suitable means.

It is desirable that the automatic circuit controlling means be so constructed that when the rotor of the generator is put in motion, there will be an automatic shifting of a control element, to transfer the movable switch member from the "talking" circuit to the "ringing" circuit. As shown in Figs. 2, 3 and 4, the switch mechanism includes a pair of thin sheets 41, 42, of resilient metallic material, the sheet 41 having a horizontal portion secured to the horizontal shelf 40 of plate 22, and a vertical portion riveted to the lower part of sheet 42. Sheet 42 has a vertical extension terminating in a small tip 43 adapted to engage pin 44 of "microswitch" 45, the latter including a pivoted contact element 46, as indicated in the schematic diagram, Fig. 11, and fixed contacts 51, 52, 53 in circuit with terminal posts 55, 54, 56, respectively; the connections from terminal 54 to contact 52 being inclusive of the generator field windings 57, 58 (Fig. 5).

The inherent resiliency of metallic sheet 42 holds it away from the pin 44 normally; but novel means are provided to flex the sheet 42 outwardly at its base, and thereby urge its upper tip 43 against pin 44, causing switch element 46 (Fig. 11) to snap over to the dashline position, engaging contact 52 and thus closing the "ringing" circuit. The novel means for flexing sheet 42 includes a cam wheel 61, a cam follower 62, and a pair of striker pins 63, 64, anchored in sheet 42 and projecting toward cam follower disc 62, so as to transmit pressure to the sheet 42 to move it outward at its base, as the cam slopes 66, 67 of the rotating cam wheel 61 push against the ribs 68, 69 of the cam follower disc 62; the latter being freely "floating" on the outer extension 70 of shaft 28, whereas cam wheel 61 is locked to the shaft, to rotate therewith, and to remain axially fixed with respect thereto. The resulting axial thrust flexes the sheet 42 about its "knee" point, causing tip 43 to push back against pin 44, to throw the switch to its opposite position, as above noted. So long as the shaft 28 continues to rotate the cam follower disc will remain in its outer position, due to the inter-engagement of teeth 81, 82 with the ribs 68, 69; but when the rotary effort ceases the inherent resiliency of sheets 41, 42 will thrust the disc 62 back to its normal position, causing ribs 68, 69 to ride back down the slopes 66, 67, thus returning the parts to thin initial relationships.

A second embodiment of the automatic switch mechanism is shown in Figs. 6, 7 and 8, wherein torsion spring 101 is connected between cam wheel 61 and cam follower disc 62, and is biased to hold the disc 62 retracted, axially, until the disc is pushed outwardly by the camming effect upon rotation of the shaft 28 and cam wheel 61. In place of flexing spring elements 41, 42 of Fig. 3 I employ, in this second embodiment, a pivoted lever 142 adapted to swing about the axis of trunnion pins 106, 107 mounted in brackets 108, 109 supported from shelf 40. Lever 142 carries striker pins 63, 64 for actuation by cam follower disc 62 in the same manner as in the first embodiment; but an additional feature is the brake arm 112 (Fig. 6) carrying brake shoes 113, 114 engaging the periphery of disc 62 and restraining the latter against axial drift, hence preventing any "chattering" of the switch elements 44 and 46 while the machine is rotating and generating "ringing" current. This brake arm 112 is riveted to the lip 116 of lever 142, and is preferably of spring steel to assure constant brake action. In other respects the construction and operation of elements 61 and 62 of Figs. 6, 7 and 8 is as previously described for Figs. 3 and 4.

The electrical connections from terminals 54, 55, 56 to the field coils and automatic switch may include bent spring fingers 121 resting on shelf 122 of plate 21, as illustrated in Figs. 2 and 3, or the interabutting fingers 126, 128 of Figs. 9 and 10. The internal flexible leads (not shown) fasten to the clips 124 (Fig. 3) or 126 (Fig. 10), and the external leads fasten to the posts 54, 55, 56. Screws 127 hold the stator in assembly.

What I claim is:

1. A generator comprising an armature, rotatable means operatively connected to said armature for rotating the latter, a switch element movable between two positions and biased to a first position, a cam operatively connected to said armature so as to be rotated therewith, a rotatable and axially shiftable cam follower operatively engaged by said cam independently of the connection between said armature, said cam and said rotatable means, said cam follower being operatively connected to said switch element, means operative on said cam follower for inhibiting rotation thereof, said cam, when rotated, causing said follower to shift axially, axial shift of said follower causing said switch element to move to its second position.

2. The generator of claim 1, in which said cam comprises a pair of concave arcuate coaxial surfaces terminating in axially projecting stops, said cam follower having fingers projecting axially toward and engaging said surfaces respectively.

3. The generator of claim 2, in which said switch element carries a member frictionally engageable with said cam follower so as to inhibit axial movement thereof.

4. The generator of claim 2, in which said cam follower comprises a side surface, said switch element carrying a member frictionally engageable with said side surface so as to inhibit axial movement of said cam follower.

5. The generator of claim 2, in which said switch element carries a resilient arm frictionally engageable with said cam follower so as to inhibit axial movement thereof.

6. The generator of claim 2, in whch said cam follower comprises a side surface, said switch element carrying a resilient arm frictionally engageable with said side surface so as to inhibit axial movement of said cam follower.

7. The generator of claim 1, in which said switch element carries a member frictionally engageable with said cam follower so as to inhibit axial movement thereof.

8. The generator of claim 1, in which said cam follower comprises a side surface, said switch element carrying a member frictionally engageable with said side surface so as to inhibit axial movement of said cam follower.

9. The generator of claim 1, in which said switch element carries a resilient arm frictionally engageable with said cam follower so as to inhibit axial movement thereof.

10. The generator of claim 1, in which said cam follower comprises a side surface, said switch element carrying a resilient arm frictionally engageable with said side surface so as to inhibit axial movement of said cam follower.

11. A generator comprising an armature, rotatable means operatively connected to said armature for rotating the latter, a switch element movable between two positions and biased to a first position, a cam operatively connected to said armature so as to be rotated thereby, and a cam follower coaxially mounted with respect to said cam and comprising a freely rotatable member axially shiftable toward and away from said cam and having a finger projecting axially toward and engaging said cam, said cam follower being mounted so as to be rotatable independently of said cam and independently of the connection between said cam, said armature and said rotatable means, said switch element, when in its biased position, frictionally engaging said cam follower and hence causing resistance to rotation thereof, axial shift of said cam follower away from said cam causing said switch element to move to its second position.

12. The generator of claim 11, in which said switch element carries a member frictionally engageable with said cam follower so as to inhibit axial movement thereof.

13. The generator of claim 11, in which said cam follower comprises a side surface, said switch element carrying a member frictionally engageable with said side surface so as to inhibit axial movement of said cam follower.

14. The generator of claim 11, in which said switch element carries a resilient arm frictionally engageable with said cam follower so as to inhibit axial movement thereof.

15. The generator of claim 11, in which said cam follower comprises a side surface, said switch element carrying a resilient arm frictionally engageable with said side surface so as to inhibit axial movement of said cam follower.

16. A generator comprising an armature, rotatable means operatively connected to said armature for rotating the latter, a switch element movable between two positions and biased to a first position, a cam operatively connected to said armature so as to be rotated thereby, said cam comprising a pair of arcuate cam surfaces inclined axially outwardly and terminating in axilaly projecting stops, and a cam follower coaxially mounted with respect to said cam on the side thereof from which said cam surfaces and stops respectively incline and project and comprising a freely rotatable member axially shiftable toward and away from said cam and having fingers projecting axially toward and engaging said cam surfaces respectively, said cam follower being mounted so as to be rotatable independently of said cam and independently of the connection between said cam, said armature and said rotatable means, said switch element, when in its biased position, frictionally engaging said cam follower and hence causing resistance to rotation thereof, axial shift of said cam follower away from said cam causing said switch element to move to its second position.

17. The generator of claim 16, in which said switch element carries a member frictionally engageable with said cam follower so as to inhibit axial movement thereof.

18. The generator of claim 16, in which said cam follower comprises a side surface, said switch element carrying a member frictionally engageable with said side surface so as to inhibit axial movement of said cam follower.

19. The generator of claim 16, in which said switch element carries a resilient arm frictionally engageable with said cam follower so as to inhibit axial movement thereof.

20. The generator of claim 16, in which said cam follower comprises a side surface, said switch element carrying a resilient arm frictionally engageable with said side surface so as to inhibit axial movement of said cam follower.

References Cited in the file of this patent

UNITED STATES PATENTS

| | | |
|---|---|---|
| 652,485 | Nolen | June 26, 1900 |
| 2,195,328 | Eaton | Mar. 26, 1940 |

FOREIGN PATENTS

| | | |
|---|---|---|
| 534,175 | Great Britain | Feb. 28, 1941 |